(12) United States Patent
Leichsenring et al.

(10) Patent No.: US 8,172,053 B2
(45) Date of Patent: May 8, 2012

(54) HYDRAULIC CIRCUIT ARRANGEMENT FOR OPERATING A HYDRODYNAMIC TORQUE CONVERTER

(75) Inventors: Horst Leichsenring, Hohentengen (DE); Berron Hairston, Friedrichshafen (DE); Jochen Birkle, Tettnang (DE); Thomas Aisenpreis, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 317 days.

(21) Appl. No.: 12/467,336

(22) Filed: May 18, 2009

(65) Prior Publication Data
US 2009/0298647 A1    Dec. 3, 2009

(30) Foreign Application Priority Data
Jun. 2, 2008    (DE) .......................... 10 2008 002 141

(51) Int. Cl.
*F16H 61/14* (2006.01)
(52) U.S. Cl. .................... 192/3.29; 192/85.63; 60/337
(58) Field of Classification Search ........ 192/3.28–3.31, 192/85.38; 60/337
See application file for complete search history.

(56) References Cited

U.S. PATENT DOCUMENTS

| | | | | |
|---|---|---|---|---|
| 2,642,168 A * | 6/1953 | Black et al. | ............... | 192/3.28 X |
| 2,702,616 A * | 2/1955 | Black et al. | ............... | 192/3.3 |
| 2,750,018 A * | 6/1956 | Dundore | ............... | 192/3.3 X |
| 3,058,373 A * | 10/1962 | Snoy et al. | ............... | 192/3.3 X |
| 3,730,315 A * | 5/1973 | Annis et al. | ............... | 192/3.3 |
| 3,774,734 A * | 11/1973 | Forster et al. | ............... | 60/337 X |
| 4,209,985 A * | 7/1980 | Master | ............... | 60/337 |
| 4,664,235 A * | 5/1987 | Yokoyama et al. | ............... | 192/3.29 |
| 4,680,928 A * | 7/1987 | Nishikawa et al. | ............... | 192/3.28 X |
| 4,957,194 A * | 9/1990 | Sawa et al. | ............... | 192/3.3 X |
| 5,010,990 A * | 4/1991 | Yoshimura et al. | ............... | 192/3.3 |
| 5,058,716 A * | 10/1991 | Lippe et al. | ............... | 192/3.31 X |
| 5,261,513 A * | 11/1993 | Vogelsang | | |
| 5,620,394 A * | 4/1997 | Iizuka | | |
| 5,673,775 A | 10/1997 | Yamamoto | | |
| 5,701,982 A | 12/1997 | Nakatani et al. | | |
| 5,762,134 A * | 6/1998 | Droste et al. | ............... | 60/337 X |
| 6,044,645 A * | 4/2000 | Greenan et al. | ............... | 60/337 |
| 6,672,056 B2 * | 1/2004 | Roth et al. | | |
| 6,951,101 B2 * | 10/2005 | Nitsche et al. | ............... | 60/337 X |
| 7,017,341 B2 * | 3/2006 | Giberson et al. | ............... | 60/337 |
| 7,617,676 B2 * | 11/2009 | Fukushima et al. | ............... | 60/337 X |
| 7,862,473 B2 * | 1/2011 | Nakamura et al. | | |

FOREIGN PATENT DOCUMENTS
DE    695 02 883    11/1995
* cited by examiner

*Primary Examiner* — Gregory Binda
*Assistant Examiner* — Matthieu Setliff
(74) *Attorney, Agent, or Firm* — Davis & Bujold, P.L.L.C.

(57) ABSTRACT

A hydraulic circuit arrangement for operating a hydrodynamic torque converter (1, 10) with a converter bridging clutch (11). The circuit arrangement comprises a hydraulic switching unit (3, 14) having at least one valve for controlling an inflow flow and a return flow of oil to the converter (1, 10) and the converter bridging clutch (11), an oil cooler (4, 15), a first line (5, 12) for acting upon the converter bridging clutch (11) with an engagement pressure ($P_{WKzu}$) and a second line (6, 13) for acting upon the converter bridging clutch (11) with a disengagement pressure ($P_{WKauf}$). The circuit arrangement comprises a bypass line (8, 17) which is connected directly with the oil cooler (4, 15) so as to bypass the hydraulic switching unit (3, 14).

13 Claims, 2 Drawing Sheets

HYDRAULIC CIRCUIT ARRANGEMENT FOR OPERATING A HYDRODYNAMIC TORQUE CONVERTER

This application claims priority from German patent application serial no. 10 2008 002 141.5 filed Jun. 2, 2008.

FIELD OF THE INVENTION

The invention concerns a hydraulic circuit arrangement and a method for the control of a converter bridging clutch.

BACKGROUND OF THE INVENTION

Hydrodynamic torque converters, also called converters for short in what follows, are used as starting aids in automatic transmissions for motor vehicles. To improve the efficiency of the automatic transmission the converter is equipped with a converter bridging clutch, called a converter clutch for short in what follows. Known converter clutches comprise a clutch piston, which is acted upon by a hydraulic liquid, referred to as oil in what follows, and thereby forms a torque connection between a pump wheel and a turbine wheel. The converter is thus bridged. The oil is supplied to the converter or converter clutch by two lines coming from a hydraulic switching unit which, as a rule, is arranged under the automatic change-speed transmission. The hydraulic switching unit (abbreviated to HSU) comprises a plurality of valves and valve slides which, among other things, also control the flow of oil to and from the converter. When the converter is active the converter clutch is disengaged. The oil then flows from the hydraulic switching unit through a line to the converter past the front side of the converter piston and, on its rear side, flows back again through another line to the hydraulic switching unit. From there the oil flows into an oil cooler. When the converter clutch is to be engaged, the flow direction in the two lines is reversed by the hydraulic switching unit so that the rear side of the converter piston is acted upon by an engagement force and the converter is thereby bridged. The disadvantage of this known oil flow system is that the return flow of the oil when the converter clutch is disengaged takes place via the hydraulic switching unit or the corresponding control valve, and this causes a pressure loss which reduces the oil flow through the converter.

SUMMARY OF THE INVENTION

The purpose of the present invention is to reduce pressure losses during operation of the converter and the converter clutch.

According to the invention it is provided that a line through which the oil flows back when the converter clutch is disengaged, is made as a bypass line around the hydraulic switching unit and is connected directly to the oil cooler. Bypassing of the hydraulic switching unit gives the advantage that the pressure drop of the oil flowing back from the converter clutch and into the cooler is reduced.

In an advantageous design it is provided that the flow through the bypass line can be controlled, in particular controlled as a function of the pressure. In a particularly advantageous design the pressure in the second line, i.e. the disengaging pressure for the converter clutch, is used as the control magnitude.

In an advantageous further development a 2/2-way valve is arranged in the bypass line, which is controlled by the disengaging pressure of the converter clutch. This gives the advantage that when the disengaging pressure for the converter clutch is applied on the 2/2-way valve the bypass line is opened and the direct flow path to the oil cooler is available. Thus, the return flow of oil takes place with lower pressure losses than in the prior art.

An advantageous embodiment provides that the bypass line with the valve is connected between the first line and a third line which connects the hydraulic switching unit to the cooler. This provides a shorter flow path with relatively less loss from the converter to the oil cooler.

According to the invention most of the oil flowing back when the converter clutch is disengaged passes directly into the oil cooler. This gives the advantage of a relatively pressure-loss-free, or low-pressure-loss return flow of the oil.

BRIEF DESCRIPTION OF THE DRAWINGS

Example embodiments of the invention are illustrated in the drawing and will be described in more detail below. The drawing shows.

DETAILED DESCRIPTION OF THE PREFERRED EMBODIMENTS

Figure 1:
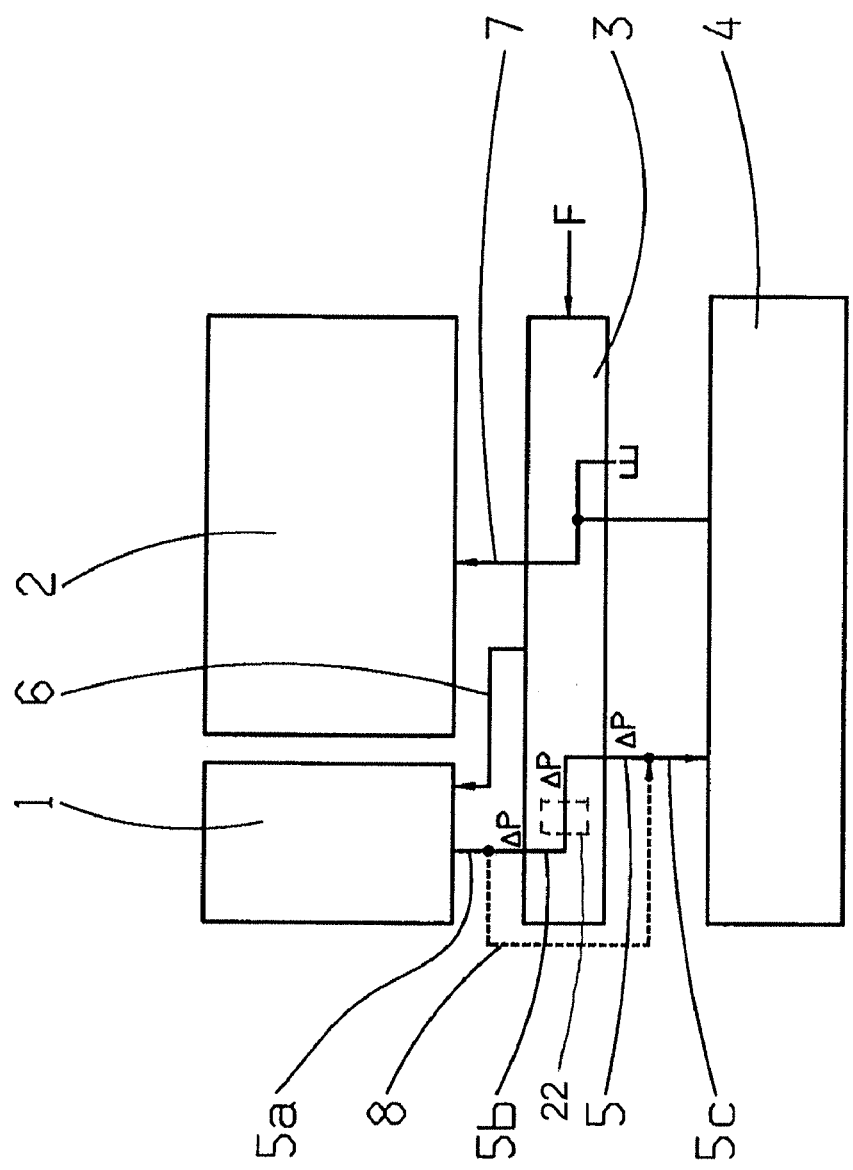
FIG. 1: A hydraulic circuit for a torque converter with a bypass line according to the invention

FIG. 1 shows a hydraulic circuit arrangement for a hydrodynamic torque converter 1, called the converter 1 in what follows, which is connected to an automatic change-speed transmission 2. The converter 1 and transmission 2 form an automatic transmission known for driving motor vehicles. The hydraulic circuit arrangement also comprises a hydraulic switching unit 3 which, from an oil source (not shown), for example an oil pump driven by the converter 1, is supplied with pressurized oil as indicated by an arrow F. In addition the hydraulic circuit arrangement comprises an oil cooler 4 which, in the form of an air-cooled or water-cooled heat exchanger, serves to cool the circulated oil. The converter 1, which comprises a converter bridging clutch (not shown) called the converter clutch in what follows, is connected by two hydraulic lines 5, 6 to the hydraulic switching unit 3. The transmission 2 is connected to the hydraulic switching unit 3 by a further line 7, a lubrication oil line. The line 5 has three sections, a first section 5a between the converter 1 and the hydraulic switching unit 3, a second section 5b passing through the hydraulic switching unit 3, and a third section 5c between the hydraulic switching unit 3 and the oil cooler 4. Both of the lines 5, 7 are connected to the oil cooler 4 via the hydraulic switching unit 3. The hydraulic circuit arrangement is shown in an operating condition when the converter clutch (not shown) is disengaged. Oil at a pressure $P_{WKauf}$ is passed through the line 6 to the converter 1 and the converter clutch, and away from it again through the line 5. Thus, the line 6 is the oil infeed line and the line 5 is the oil return line, which with its section 5b passes through the hydraulic switching unit 3 and valves 22 present therein. This causes a pressure drop indicated as P in the drawing. The circuit arrangement described so far, and in particular the line 5 with its sections 5a, 5b, 5c, correspond to the prior art.

To avoid the return flow pressure drop $\Delta P$, according to the invention a bypass line 8 (indicated by the broken lines) is provided, which bypasses the hydraulic switching unit 3 and so provides a direct connection from the converter 1 to the oil cooler 4. It is obvious that by virtue of such a bypass line 8 a pressure drop throughout the system occurs which is substantially smaller than the pressure drop produced by the known return line 5. Thus, when the converter clutch is disengaged the oil can flow directly from the converter 1 into the oil cooler 4 with relatively low pressure loss.

Figure 2:
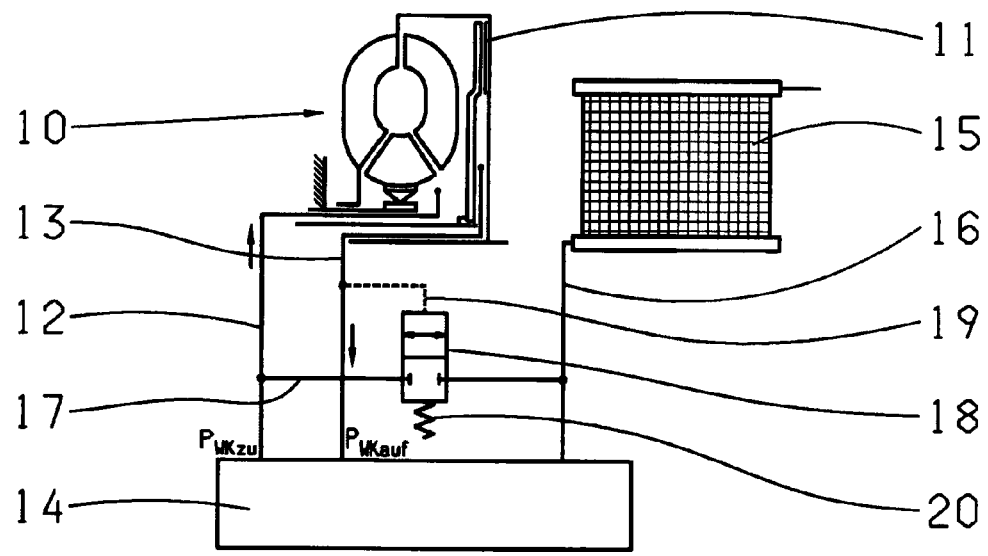
FIG. 2: A second example embodiment of the invention, for a hydraulic circuit with the converter clutch engaged.
Figure 3:
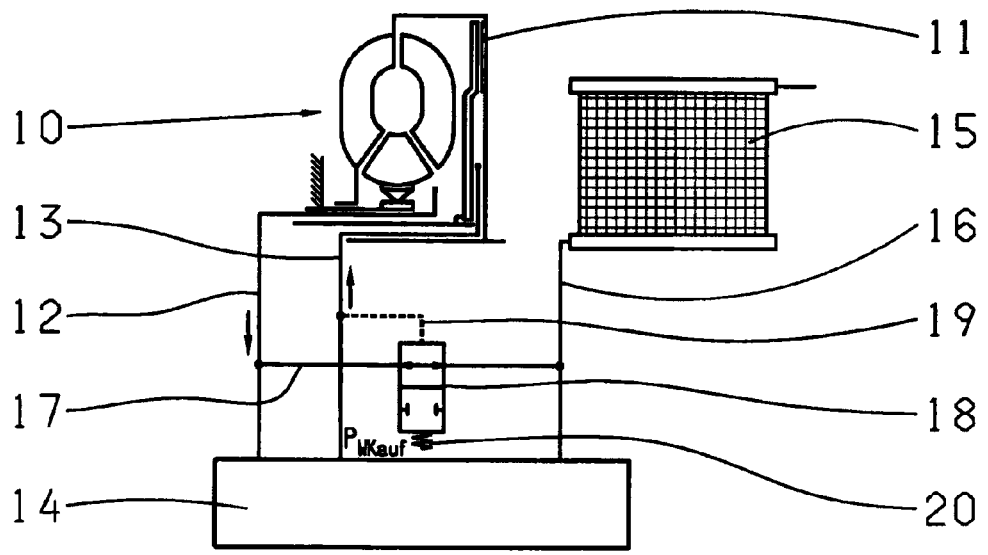
FIG. 3: The hydraulic circuit of FIG. 2 with the converter clutch disengaged.

FIG. 2 and FIG. 3 show a further example embodiment of the invention for a hydraulic circuit arrangement. A hydrodynamic torque converter 10, called the converter 10 in what follows, comprises a converter bridging clutch 11, called the converter clutch 11 in what follows, and is supplied with oil from a hydraulic switching unit 14 through two lines, a first line 12 and a second line 13. An oil cooler 15 is connected via a third line 16 to the hydraulic switching unit 14. Between the first line 12 and the third line 16 is arranged a bypass line 17 in which a 2/2-way valve 18 is fitted. The 2/2-way valve is connected to the second line 13 by a control piston (not shown) loaded by a valve spring 20.

FIG. 2 shows the circuit arrangement when the converter clutch 11 is engaged. In this operating condition the converter clutch 11 is acted upon, on one side of a clutch piston (not shown), via the line 12 with an engagement pressure $P_{WKzu}$. In this situation—as indicated by a direction arrow—the line 12 is the oil infeed line. The oil return flow takes place via the line 13 at a pressure $P_{WKauf}$ which is considerably lower than the engagement pressure in the line 12. The pressure difference between the oil infeed and the oil return determines the torque that can be transmitted by the converter clutch 11. The pressure in the return line 13 is applied via the control line 19 on the 2/2-way valve and does not overcome the spring force of the valve spring 20, so that the bypass line 17 is blocked.

FIG. 3 shows the circuit arrangement of FIG. 2 in an operating condition with the converter clutch 11 open (the same index numbers are used for the same components). This time the flow direction in the lines 12, 13 is reversed compared with that shown in FIG. 2: the oil infeed now takes place through the line 13 at the disengagement pressure $P_{WKauf}$, while oil flows back through line 12. In this case the return oil flow passes only in part through the hydraulic switching unit 14 and for the most part through the bypass line 17 and the open valve 18 into the oil cooler 15. Switching over of the valve 20 takes place because of the pressure $P_{WKauf}$ present in the line 13 and thus also in the line 19, which pushes the valve piston (not shown) against the valve spring 18 (in this case compressing it) so that the bypass line 17 is open. Accordingly, a through-flow of the oil return affected by corresponding pressure loss through the hydraulic switching unit 14 is avoided or greatly reduced, so that the pressure drop in the return flow is smaller. The bypass line 17 provides a relatively loss-free flow path from the converter 10 to the oil cooler 15, so that the overall pressure loss in the system is reduced. When the converter clutch 11 has to be engaged again the flow direction in lines 12, 13 is reversed and the pressure in line 12 is raised to the engagement pressure $P_{WKzu}$. The pressure in line 13 is then again considerably lower than the engagement pressure in line 12 and is applied via the control line 19 to the 2/2-way valve 18. By the spring force of the valve spring 20 the valve 18 is returned to its blocking position (FIG. 2), since the spring force of the valve spring 20 is larger than the pressure force acting on the valve piston of the valve 18 produced by the pressure in the control line 19. The bypass is then blocked again.

INDEXES

1 Converter
2 Transmission
3 Hydraulic switching unit
4 Oil cooler
5 First line
5a First section
5b Second section
5c Third section
6 Second line
7 Third line (lubrication oil)
8 Bypass line
10 Converter
11 Converter clutch
12 First line
13 Second line
14 Hydraulic switching unit
15 Oil cooler
16 Third line
17 Bypass line
18 2/2-way valve
19 Control line
20 Valve spring

The invention claimed is:

1. A hydraulic circuit arrangement for operating a hydrodynamic torque converter (1, 10) with a converter bridging clutch (11), the circuit arrangement comprising:
  a hydraulic switching unit (3, 14) comprising at least one valve for controlling an inflow flow and a return flow of oil to the converter (1, 10) and the converter bridging clutch (11);
  an oil cooler (4, 15);
  the torque converter (1, 10) being connected to the circuit arrangement only by a first line (5, 12) and a second line (6, 13);
  the first line (5, 12) being connected to the torque converter (1, 10) and, via the switching unit (3, 14), to the oil cooler (4, 15) for acting upon the converter bridging clutch (11) with an engagement pressure ($P_{WKzu}$);
  the second line (6, 13) being connected to the torque converter (1, 10) and the switching unit (3, 14) for acting upon the converter bridging clutch (11) with a disengagement pressure ($P_{WKauf}$); and
  a bypass line (8, 17) solely connected to the first line (5, 12) such that a flow of oil between the torque converter (1, 10) and the oil cooler (4, 15) bypasses the hydraulic switching unit (3, 14).

2. The arrangement according to claim 1, wherein the flow through the bypass line (17) is controllable.

3. The arrangement according to claim 2, wherein the flow through the bypass line (17) is controlled as a function of the disengagement pressure ($P_{WKauf}$) in the second line (13).

4. The arrangement according to claim 1, wherein a 2/2-way valve (18) is arranged in the bypass line (17) between the torque converter (1, 10) and the oil cooler (4, 15), the 2/2-way valve (18) is acted upon and controlled by the opening pressure in the second line (13).

5. The arrangement according to claim 4, wherein a third line (16) couples the hydraulic switching unit (14) with the oil cooler (15), and the bypass line (17) couples the first line (12) with the third line (16).

6. A method for controlling a converter bridging clutch (11) in a hydrodynamic converter (10), the method comprising the steps of:
  connecting a hydraulic circuit to the hydrodynamic converter (10) via only a first line (12) and a second line (13);
  engaging the converter bridging clutch (11) by supplying an engagement pressure ($P_{WKzu}$) to the converter bridging clutch (11) through the first line (12);

disengaging the converter bridging clutch (11) by supplying a disengagement pressure ($P_{WKauf}$) to the converter bridging clutch (11) through the second line (13); and
conveying an oil flow from the converter bridging clutch (11) into the first line (12) and directly to an oil cooler (4, 15) only when the converter bridging clutch (11) is supplied with the disengagement pressure ($P_{WKauf}$) 1 through the second line (13).

7. The method according to claim 6, further comprising the step of passing the oil flow into the first line (12), from the converter bridging clutch (11) to the oil cooler (4, 15), via a bypass line (8, 17) bypassing the hydraulic switching unit (3, 14), and controlling the flow through the bypass line (17).

8. The method according to claim 7, further comprising the step of controlling the flow through the bypass line (17) as a function of pressure.

9. A hydraulic circuit arrangement for operating a hydrodynamic torque converter (1, 10), the circuit arrangement comprising:
a hydraulic switching unit (3, 14),
an oil cooling unit (4, 15), and
the torque converter (1, 10) which comprises a converter bridging clutch (11);
first and second conduits (5, 6, 12, 13) connect the hydraulic switching unit (3, 14) with the torque converter (1, 10) for enabling oil to flow therebetween;
the first conduit (5, 12) conducts oil, which has an engagement pressure ($P_{WKauf}$), directly between the hydraulic switching unit (3, 14) and the converter bridging clutch (11) for engaging the converter bridging clutch (11);
the second conduit (6, 13) conducts oil, which has a disengagement pressure ($P_{WKauf}$), directly between the hydraulic switching unit (3, 14) and the converter bridging clutch (11) for disengaging the converter bridging clutch (11);
a third conduit (16) directly connects the hydraulic switching unit (3, 14) with the oil cooling unit (4, 15) for enabling oil to flow therebetween;
a bypass conduit (8, 17) connects the first conduit (5, 12) with the third conduit (16) and includes a valve (18) such that oil controllably flows directly from the torque converter (1, 10) to the oil cooling unit (4, 15) and bypasses the hydraulic switching unit (3, 14); and
the valve (18) being a 2/2-way valve and the second conduit (6, 13) directly communicating with the valve (18) for controlling the flow of oil along the bypass conduit (8, 17).

10. The arrangement according to claim 9, wherein the valve (18) is shiftable between an open position and a closed position depending on a pressure of the oil within the second conduit (6, 13).

11. The arrangement according to claim 9, wherein the converter bridging clutch (11) is engaged and the valve (18) is switched to the closed position when the pressure of the oil within the second conduit (6, 13) is lower than the disengagement pressure ($P_{WKauf}$) and the converter bridging clutch (11) is disengaged and the valve (18) is switched to the open position when the pressure of the oil within the second conduit (6, 13) is at the disengagement pressure ($P_{WKauf}$).

12. The arrangement according to claim 9, wherein a transmission is directly connected to the hydraulic switching unit (3, 14) by a further conduit (7) which communicates with the oil cooling unit (4, 15).

13. The arrangement according to claim 9, wherein one end of the bypass conduit (17) is connected to the first conduit (12) and an opposite end of the bypass conduit (17) is connected to the third conduit (16), a first port of the valve (18) is connected to one side of the bypass conduit (18) and a second port of the valve (18) is connected to an opposite side of the bypass conduit (18), the valve (18) is connected to the second conduit (13) and is either opened or closed depending on a pressure within the second conduit (13) to control the flow of oil through the bypass conduit (17).

\* \* \* \* \*